(12) United States Patent
Ford et al.

(10) Patent No.: US 8,141,768 B2
(45) Date of Patent: *Mar. 27, 2012

(54) APPLICATION OF HIGH INTEGRITY WELDING AND REPAIR OF METAL COMPONENTS IN OIL AND GAS EXPLORATION, PRODUCTION AND REFINING

(75) Inventors: Steven J. Ford, Missouri City, TX (US); Neeraj Thirumalai, Phillipsburg, NJ (US); James Ronald Rigby, Kingwood, TX (US); Mark Biegler, Houston, TN (US); Narasimha-Rao Venkata Bangaru, Pittstown, NJ (US); Jayoung Koo, Somerset, NJ (US); Glen A. Vaughn, Ozark, MO (US); Raghavan Ayer, Basking Ridge, NJ (US); Douglas P. Fairchild, Sugar Land, TX (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 324 days.

This patent is subject to a terminal disclaimer.

(21) Appl. No.: 11/643,528

(22) Filed: Dec. 21, 2006

(65) Prior Publication Data

US 2007/0181647 A1    Aug. 9, 2007

Related U.S. Application Data

(63) Continuation-in-part of application No. 11/639,533, filed on Dec. 15, 2006, now abandoned.

(60) Provisional application No. 60/763,101, filed on Jan. 27, 2006.

(51) Int. Cl.
*B23K 20/12* (2006.01)
(52) U.S. Cl. ...................................... 228/112.1; 228/2.1
(58) Field of Classification Search ............... 228/112.1, 228/2.1
See application file for complete search history.

(56) References Cited

U.S. PATENT DOCUMENTS

| 3,849,871 A | 11/1974 | Kaunitz |
| 4,333,671 A | 6/1982 | Holko |
| 4,663,244 A * | 5/1987 | Herrnkind et al. ............ 428/564 |

(Continued)

FOREIGN PATENT DOCUMENTS

WO   WO 2005094541   10/2005

(Continued)

OTHER PUBLICATIONS

U.S. Appl. No. 11/639,533, filed Dec. 15, 2006, ExxonMobil Research & Engineering (commonly Owned related application).

(Continued)

*Primary Examiner* — David Sample
*Assistant Examiner* — Megha Mehta
(74) *Attorney, Agent, or Firm* — Robert A. Migliorini

(57) ABSTRACT

A method for welding and repairing cracks in metal parts is provided by subjecting the metal parts to be welded to friction stir welding and the cracks to be repaired to friction stir processing under conditions sufficient to provide a weld joint or crack repair having a preselected property or set of properties based upon the intended use of the weldment. The FSW and FSP methods are advantageous in joining and repairing metal structures and components in applications for natural gas transportation and storage, oil and gas well completion and production, and oil and gas refinery and chemical plants.

37 Claims, 3 Drawing Sheets

U.S. PATENT DOCUMENTS

| | | | |
|---|---|---|---|
| 5,240,167 | A | 8/1993 | Ferte et al. |
| 5,713,507 | A | 2/1998 | Holt et al. |
| 6,247,634 | B1 | 6/2001 | Whitehouse |
| 6,378,760 | B1 | 4/2002 | Shimizu et al. |
| 6,585,148 | B2 | 7/2003 | Aono et al. |
| 6,607,119 | B2 | 8/2003 | Engelhard |
| 6,637,642 | B1 | 10/2003 | Lingnau |
| 6,739,795 | B1 | 5/2004 | Haataja et al. |
| 6,837,311 | B1 * | 1/2005 | Sele et al. ............ 166/353 |
| 6,866,181 | B2 | 3/2005 | Aota et al. |
| 6,892,926 | B2 | 5/2005 | O'Donnell et al. |
| 7,078,647 | B2 * | 7/2006 | Kou et al. ............ 219/75 |
| 2002/0011509 | A1 * | 1/2002 | Nelson et al. ............ 228/112.1 |
| 2003/0085257 | A1 | 5/2003 | James et al. |
| 2003/0098336 | A1 * | 5/2003 | Yamashita ............ 228/112.1 |
| 2004/0069831 | A1 | 4/2004 | O'Donnell et al. |
| 2004/0200550 | A1 | 10/2004 | Pfaffmann et al. |
| 2005/0035180 | A1 | 2/2005 | Nishiguchi et al. |
| 2005/0056075 | A1 | 3/2005 | Cripsey |
| 2005/0061853 | A1 | 3/2005 | Packer et al. |
| 2005/0072832 | A1 | 4/2005 | Han et al. |
| 2005/0139639 | A1 | 6/2005 | Larsson |
| 2005/0156010 | A1 * | 7/2005 | Flak et al. ............ 228/112.1 |
| 2006/0013645 | A1 * | 1/2006 | Ilyushenko et al. ............ 403/270 |
| 2007/0175967 | A1 * | 8/2007 | Bangaru et al. ............ 228/112.1 |

FOREIGN PATENT DOCUMENTS

WO    WO 2005113173    12/2005

OTHER PUBLICATIONS

Ayer et al., "Interface structure in a Fe-Ni friction stir welded joint", Scripta Materialia, vol. 53 (2005), pp. 1383-1387.

Nandan et al., "Recent advances in friction stir welding—Process, weldment structure and properties", Progress in Materials Science, vol. 53 (2008), pp. 980-1023.

Pilchak et al., "Microstructural changes due to friction stir processing of investment-cast Ti-6A1-4V", Metallurgical and Materials Transactions A, vol. 38 (2007), pp. 401-408.

Tomsic, Joan L. (Editor), "Dictionary of Materials and Testing", Society of Automotive Engineers, 2nd Edition, 2000, p. 394.

Pullarcot, Sunil, "Practical Guide to Pressure Vessel Manufacturing", Marcel-Dekker, 2002, pp. 100-111.

Palmer, Andrew C. and Roger A. King, "Subsea Pipeline Engineering", 2nd Edition, PennWell Corporation, 2005, pp. 127-134.

Liu, H., "Pipeline Engineering", Lewis Publishers, 2003, 224, 339-341.

Miesner, Thomas O. and William L. Leffler, "Oil and Gas Pipelines in Nontechnical Language", PennWell Corporation, 2006, pp. 305-308.

* cited by examiner

Cross section micrograph of FSW butt welded L80 steel plates (Run 1) (a) and diamond pyramid microhardness (DPH, 100 gram load) profile across this weldment (b)

(a)

(b)

APPLICATION OF HIGH INTEGRITY WELDING AND REPAIR OF METAL COMPONENTS IN OIL AND GAS EXPLORATION, PRODUCTION AND REFINING

CROSS-REFERENCE TO RELATED APPLICATION

This application is a Continuation-in-Part of U.S. patent application Ser. No. 11/639,533 filed in Express Mail No. EQ 392755079 US filed Dec. 15, 2006 now abandoned, and claims priority of U.S. Provisional Application 60/763,101 filed Jan. 27, 2006.

FIELD OF THE INVENTION

The present invention relates generally to the field of friction stir welding and friction stir processing. More specifically, the invention pertains to welding and repairing metal parts, particularly but not exclusively, ferrous metal parts, to provide welded joints with specific distinguished properties such as strength, fatigue, toughness and the like. Still more specifically, the present invention relates to the application of friction stir welding and processing in structures and components used in oil and gas exploration, production and refining.

BACKGROUND OF THE INVENTION

For convenience, various welding terms used in this specification are defined in the Glossary of Terms below.

GLOSSARY OF TERMS

CRA: Corrosion resistant alloys. A specially formulated material used for completion components likely to present corrosion problems. Corrosion-resistant alloys may be formulated for a wide range of aggressive conditions.

HAZ: Heat-affected-zone.

Heat-affected-zone: Base metal that is adjacent to the weld line and that was affected by the heat of welding.

Toughness: Resistance to fracture initiation.

Fatigue: Resistance to fracture under cyclic loading.

Fretting fatigue: Fretting involves contact between surfaces undergoing small cyclic relative tangential motion. Fretting fatigue resistance is resistance to fracture in a notched metal parts or metal parts with holes.

Yield Strength: Ability to bear load without deformation.

FS: Friction stir.

FSW: Friction stir welding.

Friction Stir Welding: A solid state joining process for creating a welded joint between two work pieces in which the heat for joining the metal work pieces is generated by plunging a rotating pin of a tool between the work pieces.

FSP: Friction stir processing.

Friction stir processing: The method of processing and conditioning the surface of a structure by pressing a FSW tool against the surface by partially plunging a pin into the structure.

Weld joint: A welded joint including the fused or thermo-mechanically altered metal and the base metal in the "near vicinity" of, but beyond the fused metal. The portion of the base metal that is considered within the "near vicinity" of the fused metal varies depending on factors known to those in the welding art.

Weldment: An assembly of component parts joined by welding.

Weldability: The feasibility of welding a particular metal or alloy. A number of factors affect weldability including chemistry, surface finish, heat-treating tendencies and the like.

Carbon equivalent: A parameter used to define weldability of steels and expressed by the formula $CE=C+Mn/6+(Cr+Mo+V)/5+(Ni+Cu)/15$ where all units are in weight percent.

Hydrogen cracking: Cracking that occurs in the weld subsequent to welding.

TMAZ: Thermo-mechanically affected zone.

Thermo-mechanically affected zone: Region of the joint that has experienced both temperature cycling and plastic deformation.

TMAZ-HZ: The hardest region in a weldment.

LNG: Liquefied natural gas. Gas, mainly methane, liquefied under atmospheric pressure and low temperature.

CNG: Compressed natural gas. Natural gas in high-pressure surface containers that is highly compressed (though not to the point of liquefaction).

PLNG: Pressurized liquefied natural gas. Gas, mainly methane, liquefied under moderate pressure and low temperature (higher temperature than LNG).

SCR: Steel catenary riser. A deepwater steel riser suspended in a single catenary from a platform and connected horizontally on the seabed.

TTR: Top tension riser. A riser on offshore oil rigs which is placed in tension to maintain even pressure on marine riser pipe.

Invar: An alloy of iron and nickel specifically designed to have low coefficient of thermal expansion Duplex: Steel consisting of two phases, specifically austenite and ferrite Trees: The assembly of valves, pipes, and fittings used to control the flow of oil and gas from a well.

BOP: Blow Out Preventer. The equipment installed at the wellhead to control pressures in the annular space between the casing and drill pipe or tubing during drilling, completion, and work over operations.

OCTG: Oil Country Tubular Goods. A term applied to casing, tubing, plain-end casing liners, pup joints, couplings, connectors and plain-end drill pipe.

Semi-submersibles: Mobile drilling platform with floats or pontoons submerged to give stability while operating. Used in deeper waters down to 360 meters or more. Kept in position by anchors or dynamic positioning.

Jack-up rigs: Mobile drilling platform with retractable legs used in shallow waters less than 100 meters deep.

TLP: Tension Leg Platform. A floating offshore structure held in position by a number of tension-maintaining cables anchored to seabed. Cables dampen wave action to keep platform stationary.

DDCV: Deep Draft Caisson Vessel. Deep draft surface piercing cylinder type of floater, particularly well adapted to deepwater, which accommodates drilling, top tensioned risers and dry completions.

Compliant towers: Narrow, flexible towers and a piled foundation supporting a conventional deck for drilling and production operations. Designed to sustain significant lateral deflections and forces, and are typically used in water depths ranging from 1,500 to 3,000 feet (450 to 900 m).

FPSO: Floating Production Storage and Offloading vessel. A converted or custom-built ship-shaped floater, employed to process oil and gas and for temporary storage of the oil prior to transshipment.

FSO: Floating Storage and Offloading vessel. A floating storage device, usually for oil, commonly used where it is not possible or efficient to lay a pipe-line to the shore. The production platform will transfer the oil to the FSO where it will be stored until a tanker arrives and connects to the FSO to offload it Tendons: Tubular tethers that permanently moor a floating platform attached at each of the structure's corners.

Umbilicals: An assembly of hydraulic hoses which can also include electrical cables or optic fibers, used to control a subsea structure or ROV from a platform or a vessel.

Tender vessels: A support/supply ship for carrying passengers and supplies to and from facilities close to shore.

LONG-FELT NEED FOR THE INVENTION

The joining of metal parts such as pipes and tubes to form pipelines for oil, gas and geothermal wells and the like is largely performed by conventional arc or fusion welding. Arc or fusion welding involves melting of a weld to create the joint. In such a process the larger the pipe diameter, or the thicker the wall of the pipe, the slower the welding becomes. For offshore pipelines, it is important that the welding be as economic as possible because of the substantial costs associated with the laybarge. Also, in welding pipes for offshore pipelines, there is the problem of bending stresses that results from the completed pipe hanging off the stem of the laybarge. In addition, conventional fusion welded joints suffer from other attributes which degrade the mechanical integrity of the joints. Examples of such attributes are tensile residual stress, hydrogen cracking, lack of fusion defects and low toughness. Thus there is a need for a new method both for rapidly joining steels and to achieve joints with superior performance.

In the case of high carbon content steels, such as casing steels that have a CE equal to or greater than 0.48, or about 0.94, current welding practice requires preheating the work pieces to 100-400° C. and forming the weld with low hydrogen electrodes to minimize the formation of a hard HAZ which is susceptible to cracking. Because of the difficulties associated with such a welding technique, often high carbon steel work pieces are mechanically joined instead using various types of couplings.

Thus there is a need for a reliable method for rapidly welding high carbon steels which minimizes grain coarsening in the HAZ and weldment cracking.

As should be appreciated from the foregoing, conventional fusion welding is prone to crack initiation that originates typically in the HAZ. In the case of the petrochemical industry where thousands of miles of pipes are installed each year to transport gas, oil and fluids, the costs for repairs are significant. Hard and low toughness regions of the weldment, especially the HAZ, are also prone to develop cracks in service particularly when the welded component is used in sour service or other aggressive process environments. It is essential that these cracks are repaired before they grow to a critical dimension when they can propagate catastrophically.

Thus there is a need for a method for economically repairing weld joints. Indeed, there is a need for repairing weld joints and metal work pieces that can be performed in the absence of an open flame.

An object of the friction stir methods disclosed herein is to provide a method for welding metal work pieces such that the weld joint has properties optimized for the intended use of the weldment.

Another object of the friction stir methods disclosed herein is to provide a method for welding high carbon steels in which grain coarseness in the HAZ is minimized.

Yet another object of the friction stir methods disclosed herein is to provide a more economical method for repairing cracks in metal work pieces.

Still yet another object of the friction stir methods disclosed herein is to eliminate or minimize weld defects and microstructural weak regions in the HAZ of structures and components used in oil and gas production and refining applications.

SUMMARY OF THE INVENTION

Broadly stated, the present disclosure provides a method for welding and for repairing metal parts, especially but not exclusively ferrous metal parts, by subjecting the faying surfaces of metal parts to be welded to FSW and the cracks to be repaired to FSP under conditions sufficient to provide a weld joint or crack repair having a preselected set of properties based on the intended use of the weldment.

In one embodiment of the disclosure the FSW tool rotational speed, load and travel speed are chosen to provide preselected properties of the weld joint or repair.

In another embodiment of the disclosure a metallic shim of preselected chemistry is interposed between the faying surfaces of the work pieces before FSW to tailor the weld properties. Typically, the property or set of properties will be selected from toughness, hardness, strength, fatigue, grain size and residual stress.

In another embodiment of the disclosure, FSW and FSP are applied to structures and components used in oil and gas production and refining applications.

In yet another embodiment of the disclosure, ferrous or non-ferrous material components used in oil/gas and/or petrochemical applications are bonded together with friction stir weldments.

In still yet another embodiment of the disclosure, ferrous or non-ferrous material components used in oil/gas and/or petrochemical applications are bonded together with a combination of friction stir and fusion weldments.

These and other embodiments of the FS methods and applications disclosed herein will become apparent upon a reading of the detailed description of the invention which follows.

BRIEF DESCRIPTION OF THE DRAWINGS

To assist those of ordinary skill in the relevant art in making and using the subject matter hereof, reference is made to the appended drawings, wherein.

DETAILED DESCRIPTION OF THE INVENTION

Figure 1:
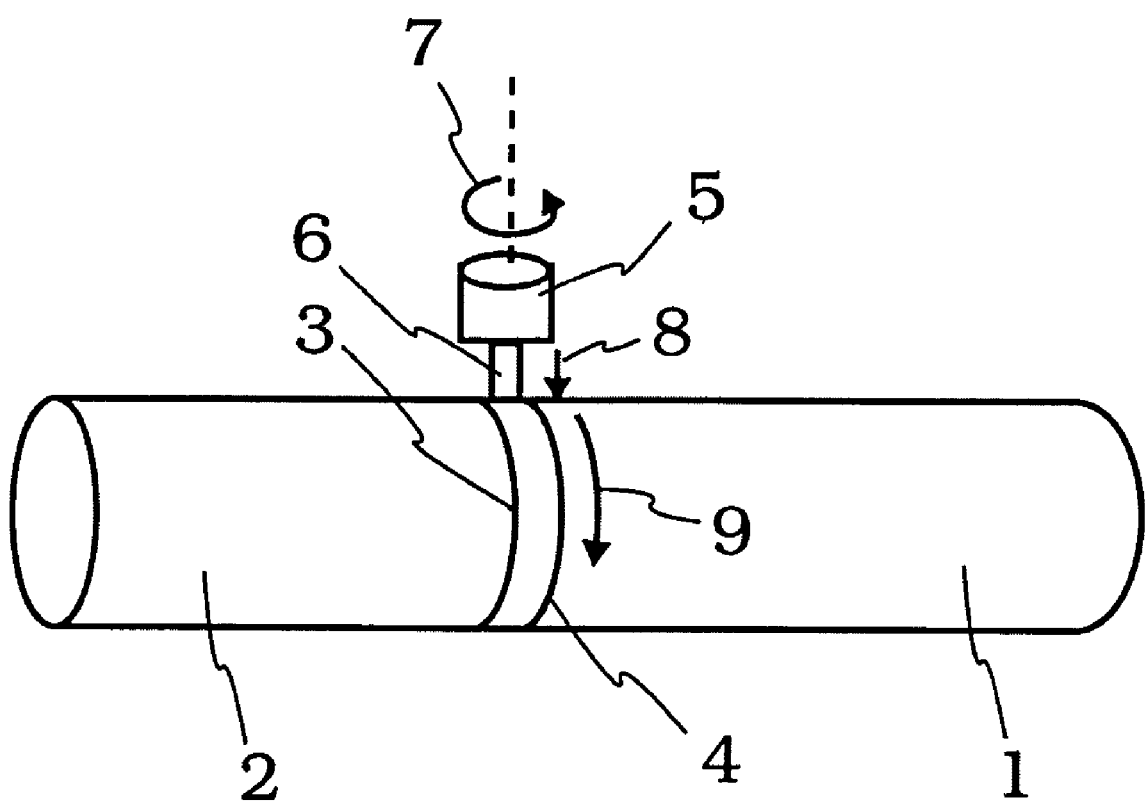
FIG. 1 is a schematic illustration of the method of joining two tubular work pieces by FSW.

Referring to FIG. 1, there are shown two tubular work pieces 1 and 2 which are positioned so that their faying surfaces 3 and 4 are in contact with each other.

The work pieces, 1 and 2, are to be welded to one another along their faying surfaces 3 and 4.

As shown in FIG. 1, the FSW tool comprises a welding head 5 having a friction pin 6. The work pieces 1 and 2 are held together by mechanical means such as clamping so that the faying surfaces 3 and 4 are in physical contact with each other before the start and during welding. The head 5 is rotated as shown by arrow 7, plunged downwardly into the work pieces 1 and 3 as shown by arrow 8 and advanced circumferentially as indicated by arrow 9. For a single sided weld, the depth of tool plunge is essentially the thickness of the work pieces or components being welded. For double sided welding such depth can be approximately half the thickness of the work pieces being welded. As a consequence, a circumferential weld is produced. The FSW tool may be composed of any tool material capable of high temperature joining, which includes ceramics, metallics, composites and other derivatives thereof.

In the case of repairing a surface-opening crack, for example in a tubular work piece, a similar procedure to that described in connection with FIG. 1 is employed except that the pin 6 is not plunged all the way into the work piece but only superficially and the direction of the advancing tool follows the contour of the crack. This is referred to as friction stir repair or friction stir processing as distinguished from friction stir welding. Repair and/or treatment are also referred to as processing.

In the practice of the present disclosure, whether performing FSW or FSP, the process is conducted under conditions sufficient to provide a weld joint or crack repair having a preselected property or set of properties based on the intended use of the weldment. For example, if the use of the weldment requires toughness over fatigue, the conditions are chosen to favor a weld having those properties.

In one embodiment of the present invention, the rotational speed, load and travel speed are chosen to provide the preselected properties of the weld joint or repair.

Figure 2:
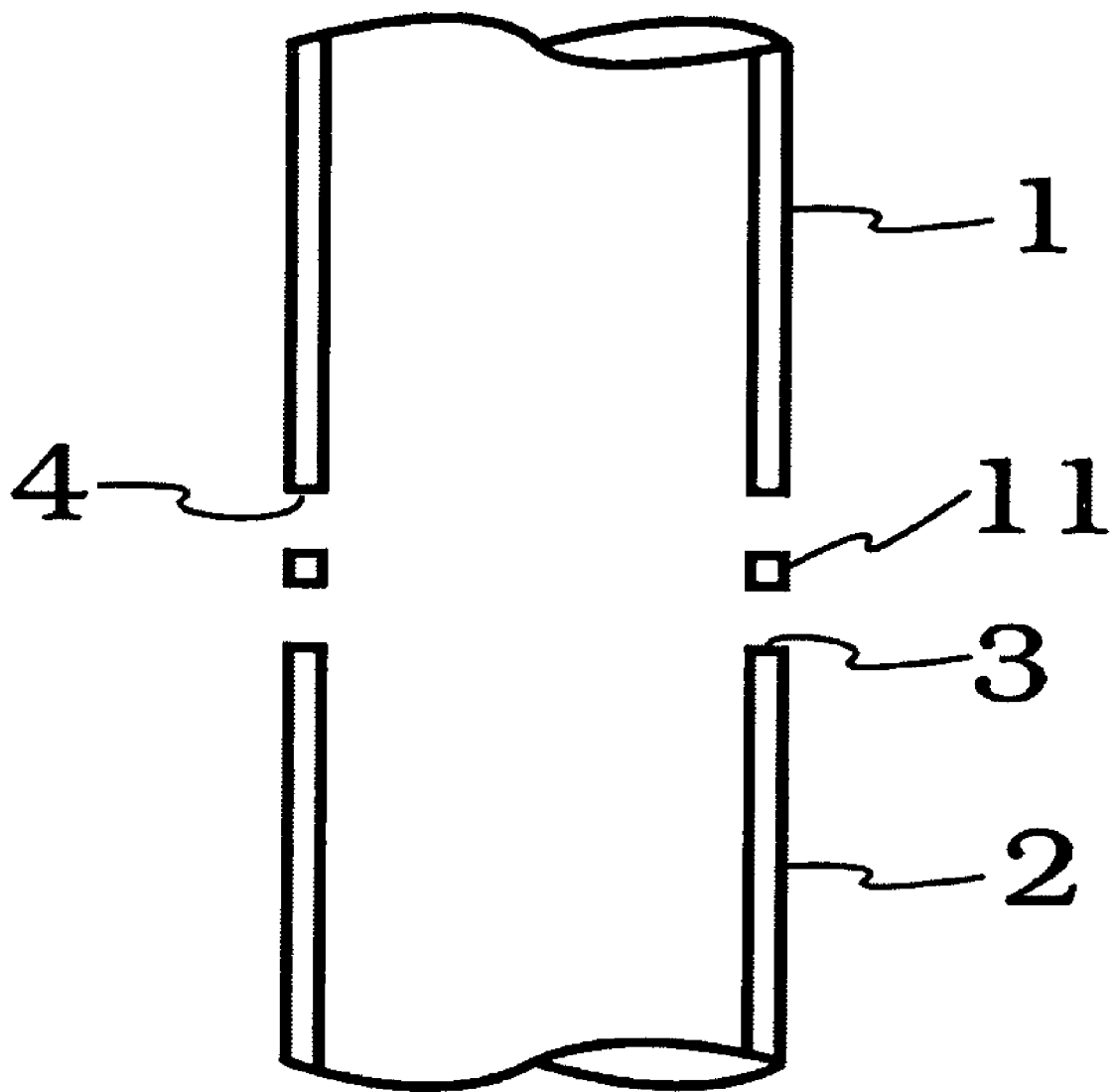
FIG. 2 is a diagram showing the use of a metallic shim in joining two pipes according to an embodiment of the present disclosure.

In the exemplary embodiment shown in FIG. 2, the work pieces 1 and 2 have a metal shim 11 interposed between the faying surface 3 and 4. The pieces are arranged so that the faying surfaces are in contact with shim 11. The FSW tool is advanced so as to form a weld incorporating the base metal of work pieces 1 and 2 and metal shim 11. In this embodiment the chemistry of the shim 11 is chosen to provide a weld joint that will meet a preselected property or properties. This is referred to as friction stir welding as distinguished from friction stir repair or friction stir processing.

In one embodiment of the friction stir methods disclosed herein, a data base of weld properties, including but not limited to toughness, strengths, hardness, fatigue, grain size and the like, for various base metals is obtained and correlated to the FSW or FSP conditions under which the weld or repair was performed. Then when a property or set of properties is chosen for weld joint for an intended application, the welding or repair conditions employed is selected from those conditions that produce the chosen property or properties.

As will be readily appreciated, the work pieces described in the above embodiments need not be formed of the same base metal. Similarly, the metal shim need not be formed of the same metal as the work pieces. Thus the work pieces may be formed of one material and the shim of a different material, the shim and one work piece may be the same and the other work piece different, or both work pieces and the shim may be different.

The benefits of FSW and FSP are primarily derived from the following characteristics: (1) lower temperatures required to perform the joining and lower temperatures in the joint cause less detrimental effects in the adjoining base metal (e.g., coarse grains); (2) high degree of plastic deformation resulting from the rotation of the tool which results in fine grain size which is conducive to improved strength and toughness; and (3) avoidance of hydrogen embrittlement in weldments as compared to fusion welds, which are often prone to hydrogen embrittlement from the decomposition of the residual moisture in the arc.

In one aspect, the friction stir methods disclosed herein are useful in welding cast irons and carbon steel components. In another aspect, the friction stir methods disclosed herein are particularly useful in welding high carbon steels, especially those having a CE equal to or greater than 0.48. Exemplary, but not limiting, plain carbon and alloy steels include, AISI 1010, 1020, 1040, 1080, 1095, A36, A516, A440, A633, A656, 4063, 4340, and 6150. Exemplary, but not limiting, high carbon steels include, AISI WI, SI, O1, A2, D2, M1, and API L80. In another aspect of the present disclosure, FSW is useful in treating/welding ferrous corrosion resistant alloys, including but not limited to, stainless steel. Exemplary, but not limiting, stainless steels include, AISI 409, 446, 304, 316L, 410, 440A, 17-7 PH and duplex s.s. In a further aspect of the present disclosure, FSW is useful in treating/welding non-ferrous alloys, including but not limited to, titanium alloys, cobalt alloys, iron-nickel alloy, and nickel alloys.

In still yet another form of the present disclosure, FSW and FSP may be used in the welding of duplex stainless steels (duplex s.s. or DSS). Duplex s.s. derives its strength and corrosion resistance from a controlled balance of ferrite and austenite phases. The desired mixture of phases in the bulk duplex s.s. is achieved by controlled hot working and/or a combination of cold working and annealing treatments. However, when duplex s.s. is welded, the steel is heated to a very high temperature in a single phase ferrite region and cools to the duplex phase upon cooling to room temperature. In order to achieve the required balance of phases in the weldment at room temperature, the cooling rate of the weld has to be controlled. In practice, the cooling rate varies considerably affecting the phase balance and thus the resultant properties of the weldment. FSW of duplex s.s. may provide a more consistent phase balance since the temperature of the joints may be more precisely controlled, and in particular may be done at a lower temperature in the two phase region, thus consistently yielding an acceptable microstructure and resultant properties.

The friction stir weld (FSW) and friction stir processing (FSP) methods described herein may be used to form welds, for example as spot welds and butt welds, as well as to repair weld areas. More particularly, FSW and FSP may be used to join and repair/treat respectively structures and structural components associated with the oil and gas industry. The joining via FSW may be performed either in a manufacturing facility such as a steel mill where the components are made or in the field of fabrication yard where the components are assembled. The repair and treatment via FSP is generally made in the field. The resultant structures exhibit superior mechanical integrity and, in many instances, may be joined and repaired/treated at a lower cost.

The FSW and FSP methods disclosed herein are suitable for forming and repairing/treating structures in oil and gas exploration, production and refining applications. FSW is particularly advantageous for forming spot welds and butt welds of tubular components in these types of applications. The FSW and FSP methods disclosed herein may also be used in conjunction with fusion welding methods to form and/or repair metal components.

Exemplary, but non-limiting, structures in the oil and gas exploration, production, refining industry where friction stir welding and processing for joining and repairing such metal structures, are high strength pipeline weld areas, SCR and TTR weld areas, threaded components, oil drilling equipment weld areas (i.e. two sections of a deep water oil drill string), LNG and PLNG container weld areas, riser/casing joints, and well head equipment.

In oil and gas upstream applications, the FSW and FSP methods disclosed herein are suitable for joining and repairing structures and components used in natural gas transportation and storage type applications. In particular, FSW and FSP may be utilized to enable gas transportation technologies ranging from pipelines, compressed natural gas (CNG), pressurized liquefied natural gas (PLNG), liquefied natural gas (LNG) and other storage/transportation technologies. In one form in natural gas transportation and storage type applications, the FSW and FSP methods disclosed herein may be used for the joining/processing of pipelines, flow lines, gathering lines, expansion loops, and other transmission lines. In another form in natural gas transportation and storage type applications, the FSW and FSP methods disclosed herein may be used for joining/processing of materials made of carbon steels, cast irons, structural steels, or corrosion resistant alloys comprising steels, cast irons, stainless steels, duplex stainless steels, nickel or cobalt based alloys, other Fe—Ni alloys (e.g. Invar) or joining of other dissimilar metals (e.g. steel and nickel). In yet another form in natural gas transportation and storage type applications, the FSW and FSP methods disclosed herein may be used for the joining/processing of LNG, CNG, and PLNG storage and/or transportation structures. This includes modular LNG structures, shipping vessels, transferring components and pipelines, and related technologies (e.g. Al tanks, 9% Ni tanks, Invar tanks).

In oil and gas exploration and production applications, the FSW and FSP methods disclosed herein also may be utilized for joining and repairing various structures used for oil and gas well completion and production. These structures include, but are not limited to, offshore and onshore production structures, oil pipelines, oil storage tanks, casing/tubing, completion and production components, cast structure to flow line connections, subsea components, downhole tubular products (e.g. OCTG), topsides and related structures, umbilicals, tender and supply vessels, and flare towers. More particularly, exemplary offshore production structures include jacketed platforms, mobile offshore drilling units and related production components like casings, tendons, risers, and subsea facilities. Mobile offshore drilling units include, but are not limited to, semi-submersibles and jack-up rigs, TLPs, DDCVs, compliant towers, FPSO, FSO, ships, tankers and the like. Exemplary subsea components include, but are not limited to, duplex, manifold systems, trees, and BOPs. Exemplary topsides and related structures include deck superstructures, drilling rigs, living quarters, helidecks, and related structures. It should be understood that FSW may be used to form the welds comprising such structures and components and FSP may be used to repair and treat the welds or joints comprising such structures.

In downstream applications, the FSW and FSP methods disclosed herein are suitable for joining and repairing structures and components used in refining and chemical plants. FSW and FSP provide advantages in the refining and chemicals plant applications through, inter alia, repair of components/structures, dissimilar metal joining, joining of steel structures and joining of difficult to weld materials, such as cast iron. These applications include, but are not limited to, cast iron, heat exchanger tubes and low and high-temperature process and pressure vessels. Exemplary low and high-temperature process and pressure vessels include steam cracker tubes, steam reforming tubes, and refinery structures and components.

EXAMPLE

API L80 grade steel plates having a CE of 0.94 were joined by FSW under the conditions described below. Normally such high CE value steels would be joined by mechanical connection and not by conventional fusion welding.

Two runs were conducted under the processing parameters given in Table 1 below. In each run a polycrystalline cubic boron nitride tool was used with a single sided, partial penetration on the top of the plates.

TABLE 1

| Run | Tool Rotation | Z-Load | Travel Speed |
|---|---|---|---|
| 1 | 450 rpm | 9,000 lb. | 4 ipm |
| 2 | 550 rpm | 7,000 lb. | 4 ipm |

Figure 3:
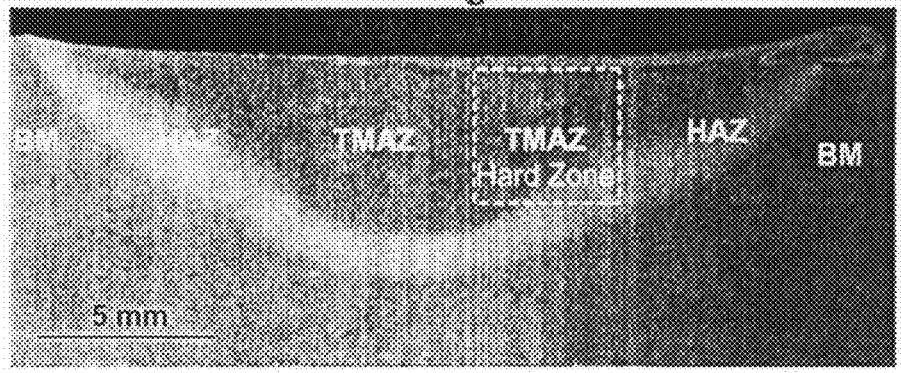
FIG. 3 is cross section micrograph (a) of FSW butt welded L80 steel plates (Run 1, Table 1) and diamond pyramid microhardness (DPH, 100 gram load) profile across this weldment (b).
Figure 3:
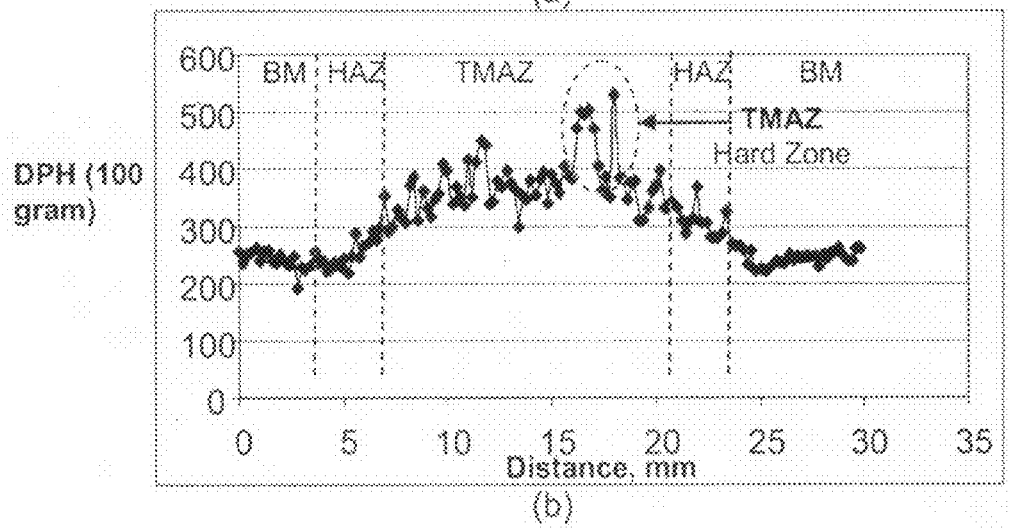

Low magnification optical images of weld cross sections indicating various regions of the samples showed that the weldments were made without any macroscopic defects, FIG. 3. This micrograph also shows the various microstructure regions formed in the FSW weldment.

The average grain size variation in different regions of the weldments is given in Table 2.

TABLE 2

| | Average Grain Size (µm) | | | |
|---|---|---|---|---|
| Run | Base Metal | HAZ | TMAZ | TMAZ-HZ |
| 1 | 20 | 13 | 25 | 30 |
| 2 | 20 | 16 | 30 | 28 |

Microhardness profiles were also obtained for the weldments, an example of such analysis is shown in FIG. 3. The DPH (diamond pyramid hardness) was about 75 DPH lower for the weldment formed at the lower rotational speed (Run 1).

Applicants have attempted to disclose all forms and applications of the disclosed subject matter that could be reasonably foreseen. However, there may be unforeseeable, insubstantial modifications that remain as equivalents. While the present disclosure has been described in conjunction with specific, exemplary forms thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. All numerical values within the detailed description and the claims herein are also understood as modified by "about."

What is claimed is:
1. A method for welding non-ferrous metal parts comprising:
    subjecting two or more segments of the metal parts to fusion welding with a metal filler along the entire length and through the entire thickness of the segments to form a fusion weld;

friction stir welding at least a portion of the fusion weld friction stir processing under conditions sufficient to provide a weld joint, wherein said two or more segments of non-ferrous material components are a nickel based alloy, a cobalt based alloy, a titanium based alloy or combinations thereof.

2. The method of claim 1 wherein the preselected property or set of properties is selected from toughness, hardness, strength, fatigue, grain size, and residual stress.

3. The method of claim 2 wherein the conditions sufficient to provide the weld joint are selected from at least one of the rotational speed, load and travel speed of the friction stir welding tool used to affect the weld or repair.

4. The method of claim 3 wherein the condition sufficient to provide a weld joint having a preselected property or set of properties includes interposing a metal shim of preselected chemistry between the faying surfaces of the metal parts to be welded before subjecting them to friction stir welding.

5. A method for welding two work pieces of non-ferrous metal to produce a weld joint having a specific property or set of properties chosen for an intended application, the method comprising:

obtaining a data base of weld properties for weld joints formed by friction stir welding under a plurality of conditions and from various metal compositions;

correlating the weld conditions and metal compositions to the weld properties;

selecting weld conditions from the data base that will produce a weld joint having the property or set of properties best suited to the intended application;

subjecting two or more segments of the metal work pieces to fusion welding with a metal filler along the entire length and through the entire thickness of the segments to form a fusion weld under the conditions selected;

subjecting the work pieces to friction stir welding under the conditions selected, wherein said two or more segments of non-ferrous material components are a nickel based alloy, a cobalt based alloy, a titanium based alloy or combinations thereof.

6. The method of claim 1 wherein the metal parts are used in natural gas transportation and storage type structures and components.

7. The method of claim 6 wherein the natural gas transportation and storage type structures and components are chosen from pipelines, flow lines, gathering lines, transmission lines, shipping vessels, transferring components, storage tanks, and expansion loops.

8. The method of claim 6 wherein the natural gas is in the form of liquefied natural gas, compressed natural gas or pressurized liquefied natural gas.

9. The method of claim 1 wherein the metal parts are used in oil and gas well completion and production structures and components.

10. The method of claim 9 wherein the oil and gas well completion and production structures and components are chosen from cast structures to flow connections, subsea components, casing/tubing, completion and production components, downhole tubular products, oil pipelines, oil storage tanks, off-shore production structures/components, topsides, deck superstructures, drilling rigs, living quarters, helidecks, umbilicals, tender and supply vessels, and flare towers.

11. The method of claim 10 wherein the off-shore production structures/components are chosen from jacketed platforms, mobile offshore drilling units, casings, tendons, risers, subsea facilities, semi-submersibles, jack-up rigs, tension leg platforms, deep draft caisson vessels, compliant towers, floating production storage and offloading vessels, floating storage and offloading vessels, ships, and tankers.

12. The method of claim 10 wherein the subsea components are chosen from duplexes, manifold systems, trees and blow out preventers.

13. The method of claim 1 wherein the metal parts are used in oil and gas refinery and chemical plant structures and components.

14. The method of claim 13 wherein the oil and gas refinery and chemical plant structures and components are chosen from cast iron components, heat exchanger tubes, and low and high temperature process and pressure vessels.

15. The method of claim 14 wherein the low and high temperature process and pressure vessels are chosen from steam cracker tubes, and steam reforming tubes.

16. The method of claim 5 wherein the intended application is natural gas transportation and storage type structures and components.

17. The method of claim 16 wherein the natural gas transportation and storage type structures and components are chosen from pipelines, flow lines, gathering lines, transmission lines, shipping vessels, transferring components, storage tanks, and expansion loops.

18. The method of claim 16 wherein the natural gas is in the form of liquefied natural gas, compressed natural gas or pressurized liquefied natural gas.

19. The method of claim 5 wherein the intended application is oil and gas well completion and production structures and components.

20. The method of claim 19 wherein the oil and gas well completion and production structures and components are chosen from cast structures to flow connections, subsea components, casing/tubing, completion and production components, downhole tubular products, oil pipelines, oil storage tanks, off-shore production structures/components, topsides, deck superstructures, drilling rigs, living quarters, helidecks, umbilicals, tender and supply vessels, and flare towers.

21. The method of claim 20 wherein the off-shore production structures/components are chosen from jacketed platforms, mobile offshore drilling units, casings, tendons, risers, subsea facilities, semi-submersibles, jack-up rigs, tension leg platforms, deep draft caisson vessels, compliant towers, floating production storage and offloading vessels, floating storage and offloading vessels, ships, and tankers.

22. The method of claim 20 wherein the subsea components are chosen from duplexes, manifold systems, trees and blow out preventers.

23. The method of claim 5 wherein the intended application is oil and gas refinery and chemical plant structures and components.

24. The method of claim 23 wherein the oil and gas refinery and chemical plant structures and components are chosen from cast iron components, heat exchanger tubes, and low and high temperature process and pressure vessels.

25. The method of claim 24 wherein the low and high temperature process and pressure vessels are chosen from steam cracker tubes, and steam reforming tubes.

26. A non-ferrous material component for use in the oil, gas and/or petrochemical industry comprising:

two or more segments of non-ferrous material components, and a combination of friction stir and fusion weld bonding adjacent segments of said components together, wherein said two or more segments of non-ferrous material components are a nickel based alloy, a cobalt based alloy, a titanium based alloy or combinations thereof, wherein the friction stir weld is formed after the fusion weld, and wherein said fusion weld with filler metal is continuously present along the entire length and through the entire thickness of the adjacent segments.

27. The component of claim 26 chosen from high strength pipelines, steel catenary risers, top tension risers, threaded components, liquefied natural gas containers, pressurized liquefied natural gas containers, deep water oil drill strings, riser/casing joints, and well-head equipment.

28. The component of claim 26 wherein said component is used in natural gas transportation and storage type structures and components.

29. The component of claim 28 wherein said natural gas transportation and storage type structures and components are chosen from pipelines, flow lines, gathering lines, transmission lines, shipping vessels, transferring components, storage tanks, and expansion loops.

30. The component of claim 29 wherein said natural gas is in the form of liquefied natural gas, compressed natural gas or pressurized liquefied natural gas.

31. The component of claim 26 wherein said component is used in oil and gas well completion and production structures and components.

32. The component of claim 31 wherein said oil and gas well completion and production structures and components are chosen from cast structures to flow connections, subsea components, casing/tubing, completion and production components, downhole tubular products, oil pipelines, oil storage tanks, off-shore production structures/components, topsides, deck superstructures, drilling rigs, living quarters, helidecks, umbilicals, tender and supply vessels, and flare towers.

33. The component of claim 32 wherein said off-shore production structures/components are chosen from jacketed platforms, mobile offshore drilling units, casings, tendons, risers, subsea facilities, semi-submersibles, jack-up rigs, tension leg platforms, deep draft caisson vessels, compliant towers, floating production storage and offloading vessels, floating storage and offloading vessels, ships, and tankers.

34. The component of claim 32 wherein said subsea components are chosen from duplexes, manifold systems, trees and blow out preventers.

35. The component of claim 26 wherein said component is used in oil and gas refinery and chemical plant structures and components.

36. The component of claim 35 wherein said oil and gas refinery and chemical plant structures and components are chosen from cast iron components, heat exchanger tubes, and low and high temperature process and pressure vessels.

37. The component of claim 36 wherein said low and high temperature process and pressure vessels are chosen from steam cracker tubes, and steam reforming tubes.

* * * * *